US008113021B2

(12) United States Patent
Tsai

(10) Patent No.: US 8,113,021 B2
(45) Date of Patent: Feb. 14, 2012

(54) DOOR LOCK WITH AN IMPROVED STRUCTURE

(75) Inventor: Miao-Hsueh Tsai, Taichung (TW)

(73) Assignee: Imperial (Asia) Limited, Mongkok (HK)

(*) Notice: Subject to any disclaimer, the term of this patent is extended or adjusted under 35 U.S.C. 154(b) by 713 days.

(21) Appl. No.: 12/249,419

(22) Filed: Oct. 10, 2008

(65) Prior Publication Data

US 2009/0120142 A1 May 14, 2009

(30) Foreign Application Priority Data

Oct. 12, 2007 (CN) ...................... 2007 2 0177812 U

(51) Int. Cl.
*B60R 25/02* (2006.01)
*B62H 5/04* (2006.01)
*E05B 13/10* (2006.01)
*F16C 3/00* (2006.01)
*G05G 5/00* (2006.01)

(52) U.S. Cl. ................ 70/224; 70/221; 70/222; 70/223; 70/472; 70/478; 70/371; 292/348; 292/352; 292/353; 292/354; 292/355; 292/336.3

(58) Field of Classification Search .................... 70/221, 70/222, 223, 224, 472, 478, 371; 292/348, 292/352, 353, 354, 355, 336.3
See application file for complete search history.

(56) References Cited

U.S. PATENT DOCUMENTS

| | | | | |
|---|---|---|---|---|
| 3,026,136 | A * | 3/1962 | Russell et al. | 292/336.3 |
| 3,856,339 | A * | 12/1974 | Tornoe et al. | 292/336.3 |
| 6,908,126 | B2 * | 6/2005 | Senger | 70/224 |
| 7,581,421 | B2 * | 9/2009 | Don et al. | 70/224 |
| 2006/0042337 | A1 * | 3/2006 | Su | 70/224 |
| 2008/0087051 | A1 * | 4/2008 | Huang | 70/91 |

* cited by examiner

*Primary Examiner* — Suzanne Barrett
*Assistant Examiner* — David E Sosnowski
(74) *Attorney, Agent, or Firm* — Wang Law Firm, Inc.; Li K. Wang

(57) ABSTRACT

A door lock with an improved structure is disclosed. It has a turning device that includes a positioning base. The positioning base is mounted with a circular spacer with a lock control device therein. A connecting shaft for driving the lock control device is provided with a limiting element that has a protruded stopping part at its end. The lock has a lock core whose one end allows the insertion and turning of a key. Its other end is connected with the connecting shaft and has grooves, so that the stopping part of the limiting element blocks the lock core when the door is locked.

2 Claims, 5 Drawing Sheets

DOOR LOCK WITH AN IMPROVED STRUCTURE

BACKGROUND OF THE INVENTION

1. Field of Invention

The invention relates to a door lock with an improved structure and in particular, to a door lock whose outer handle cannot be taken off when it is locked.

2. Related Art

The conventional door lock, as shown in FIG. 6, has a turning device on the outer side of the door. A circular spacer 91 is provided in the handle 93. A limiting element 92 is disposed in the circular spacer 91, with a protruding part 921 extending out of the circular spacer 91. The limiting element 92 also has a connecting hole 922 therein for a connecting shaft (not shown) to go through. The handle 93 on the device has a concave hole 931, through which one can see the protruding part 921. By pressing tie protruding part 921, one can take off the handle 93 from the turning device.

Any skilled person can easily see the protruding part 921 of the limiting element 92 in the circular spacer 91 from the concave hole 931 on the handle 93. Using a simple tool to press the protruding part 921 outside the circular spacer 91, the person can readily take the handle 93 on the outer side of the door off the turning device. Afterwards, by adjusting other components of the turning device, the person can easily unlock the door lock and enter the room.

It is thus imperative to provide a door lock whose handle 93 cannot be taken off when the turning device is locked.

SUMMARY OF THE INVENTION

An objective of the invention is to provide a door lock with an improved structure. Using a stopping part installed on the limiting element inside the circular spacer and a matching groove on one end of the lock core inside the lock, the protruding part of the limiting element still stays inside the concave hole of the handle when the door lock is locked. Therefore, one cannot take off the handle on the outer side of the door once it is locked, achieving a better anti-theft effect.

To achieve the above-mentioned objective, the invention includes:

a positioning base disposed on the outer side of a door, whose center has a through hole;

a hollow circular spacer, which is mounted from the inner side of the positioning base through its through hole and whose one end is pivotally connected to the inner side of the positioning base;

a limiting element vertically disposed inside the circular spacer oil the outer side of the positioning base, whose center has a connecting hole and whose one end has a protruding part extending out of the circular spacer for pressing, wherein a stopping part is disposed between the protruding part and tie connecting hole in the circular spacer, the limiting element is urged by an elastic element provided in the circular spacer on the end of the protruding part, and the circular spacer has space for the limiting element to displace along the pressing direction;

a connecting shaft, whose one end goes through the positioning base, is positioned in the circular spacer on the outer side of the positioning base, and extends out of the connecting hole of the limiting element, the diameter of the connecting hole being greater than the diameter of the connecting shaft;

a lock control device, which is disposed in the circular spacer inside the positioning base so that the connecting shaft also goes through the lock control device to control its lock state; and a handle, which has a junction hole on one side for the connection with the circular spacer outside the positioning base and a concave hole in connection with the handle and for the protruding part to fall therein as a block at the position corresponding to the protruding part of the limiting element, wherein the handle is provided with a lock with a lock core whose one end allows the insertion and turning of a key and whose other end is formed inward with a groove on two opposite sides for the stopping part of the limiting element to fall into, and one end of the groove is also connected with the extended end of the connecting shaft so as to move it as the handle turns.

When the door lock is in the unlock state, the stopping part of the limiting element falls in the groove on the end of the lock with the lock core. Therefore, the limiting element can retreat into the circular spacer when the protruding part is pressed.

When the door lock is in the lock state, the stopping part of the limiting element has a displacement from the groove on the lock core. Therefore, the pressed protruding part of the limiting element cannot retreat into the circular spacer as it is blocked by the outer edge of the lock core.

BRIEF DESCRIPTION OF THE DRAWINGS

The invention will become more fully understood from the detailed description given herein below illustration only, and thus is not limitative of the present invention, and wherein.

DETAILED DESCRIPTION OF THE INVENTION

Figure 1:
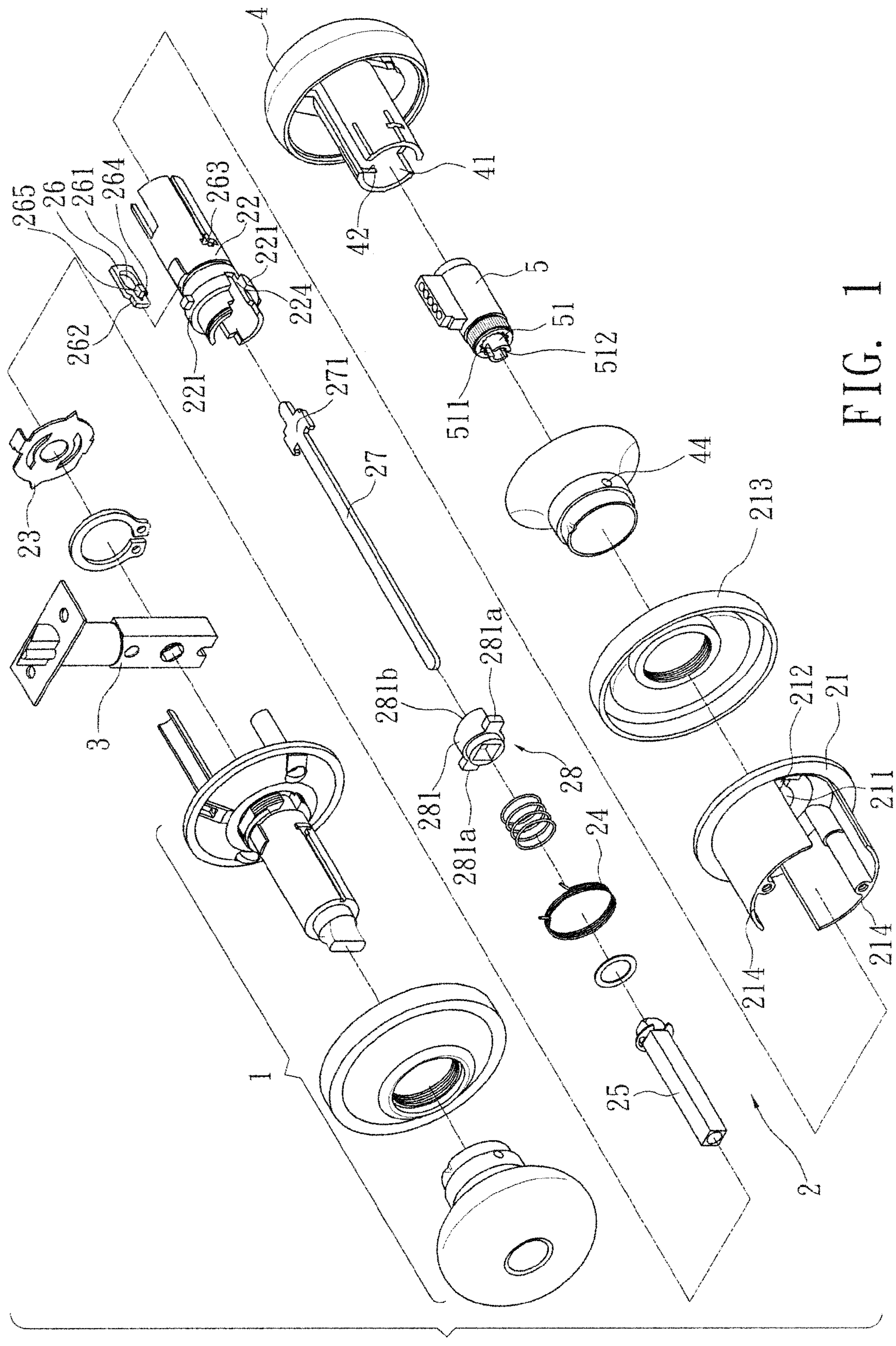
FIG. 1 is a three-dimensional exploded view of the invention.

The present invention will be apparent from the following detailed description, which proceeds with reference to the accompanying drawings wherein the same references relate to the same elements.

The disclosed door lock with an improved structure has an inner turning device 1 inside a door and an outer turning device 2 outside the door. It further has a lock base 3 inside the door matching with the two turning devices 1, 2.

The outer turning device 2 has a positioning base 21, a hollow circular spacer 22, a limiting element 26, a connecting shaft 27, a lock control device 28, and a handle 4.

The positioning base 21 is connected and fixed with the inner turning device 1, and is disposed on the outer side of the door. Its center has a through hole 211. In this embodiment, a first concave part 212 in connection with the through hole 211 is respectively formed on two opposite sides of the through hole 211 on the positioning base 21. A protective cover 213 is screwed along the outer edge. Two ribs 214 in connected with the turning device 1 extend horizontally on the inner side.

The hollow circular spacer 22 has two hollow ends. It goes from the inner side of the positioning base 21 via the through hole 211 to the outside. One end of the circular spacer 22 is pivotally connected to the inner side of the positioning base 21. In this embodiment, the circular spacer 22 is pivotally connected to one end of the positioning base 21. Its two sides have a first concave part 212 and a second concave part 224 connecting to the positioning base 21, respectively. One end of the circular spacer 22 on the inner side of the positioning base 21 is connected with a fixing element 23. With several protruding parts 221 on both sides of the positioning base 21, the positioning base 21 is positioned between the protruding parts 221 of the circular spacer 22 and the fixing element 23 and can rotate therein. A torsion spring 24 is provided between the fixing element 23 and the protruding parts 221 of the circular spacer 22 in the positioning base 21. It urges against the inner side of the positioning base 21, so that the circular spacer 22 can automatically resume its position during rotation. A driving element 25 goes through the fixing element 23 and is positioned on the end of the circular spacer 22 on the inner side of the positioning base 21. The driving element 25 connects to the lock base 3 and controls its lock state.

The limiting element 26 is vertically disposed in the circular spacer 22 on the outer side of the positioning base 21. Its center has a connecting hole 261 and a protruding part 262 extending out of the circular spacer 22. The inner wall of the circular spacer 22 on the end opposite to the protruding part 262 of the limiting element 26 is formed with a hollow part 263. When the protruding part 262 of the limiting element 26 is pressed by the user, its other end falls into the hollow part 263. The limiting element 26 makes a displacement inside the circular spacer 22. The end of the protruding part 262 of the limiting element 26 is urged by the elastic element 222 in the circular spacer 22. In this embodiment, the limiting element 26 has an urging hole 264 below the protruding part 262. The elastic element 222 is an elastic rod, whose one end goes through the urging hole 264 and urges against the protruding part 262. The limiting element 26 further has a stopping part 265 between the protruding part 262 and the connecting hole 261. The stopping part 265 protrudes toward the opening of the circular spacer 22 outside the positioning base 21.

One end of the connecting shaft 27 goes through the positioning base 21 and is positioned in the circular spacer 22 outside the positioning base 21. The other end of the connecting shaft 27 extends out of the connecting hole 261 of the limiting element 26. The diameter of the connecting hole 261 is greater than the diameter of the connecting shaft 27. In this embodiment, the end of the connecting shaft 27 in the circular spacer 22 has a stopping part 271 urging against the limiting element 26.

Figure 4:
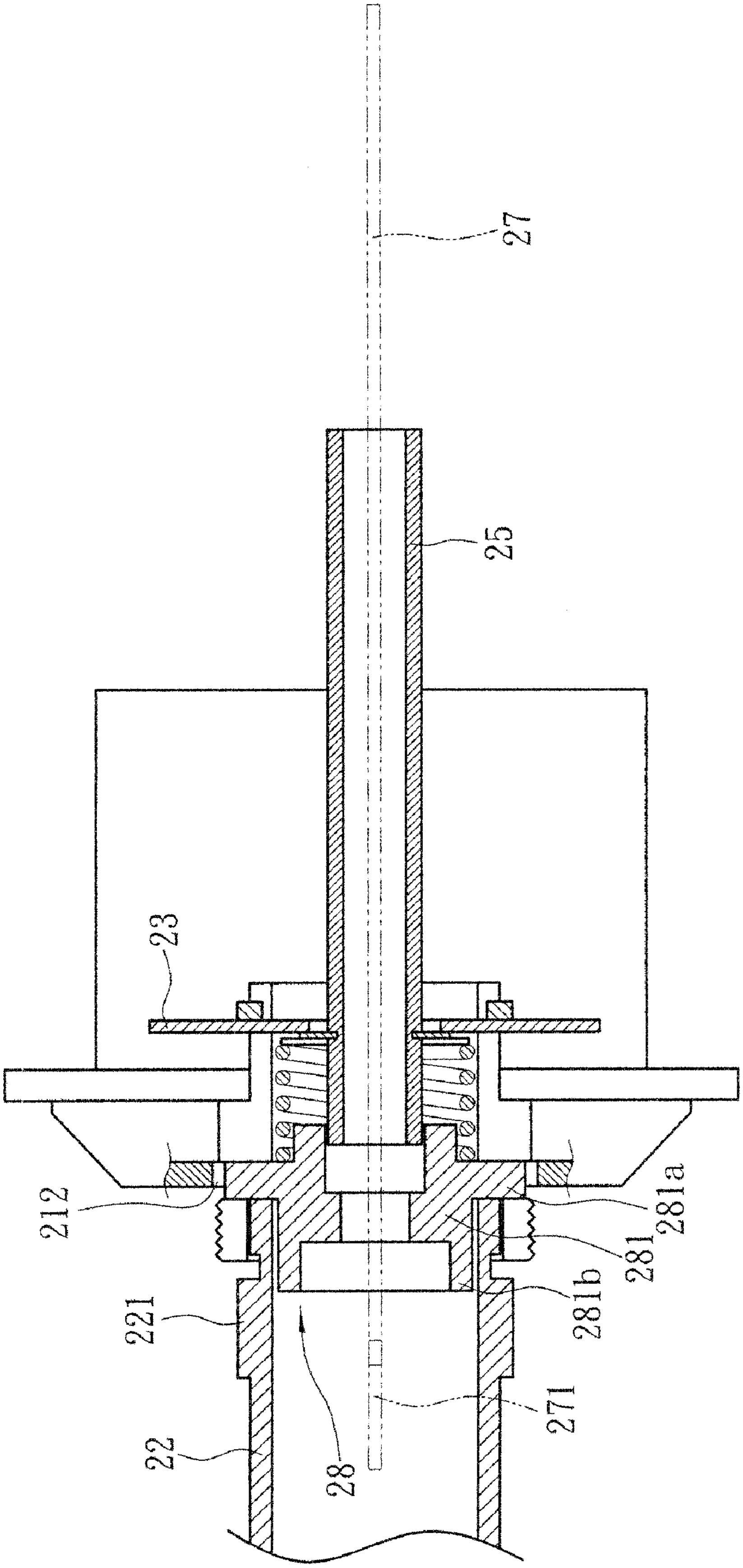
FIG. 4 is a schematic view showing the positions of the connecting shaft and the rotator when the disclosed door lock is locked.
Figure 5:
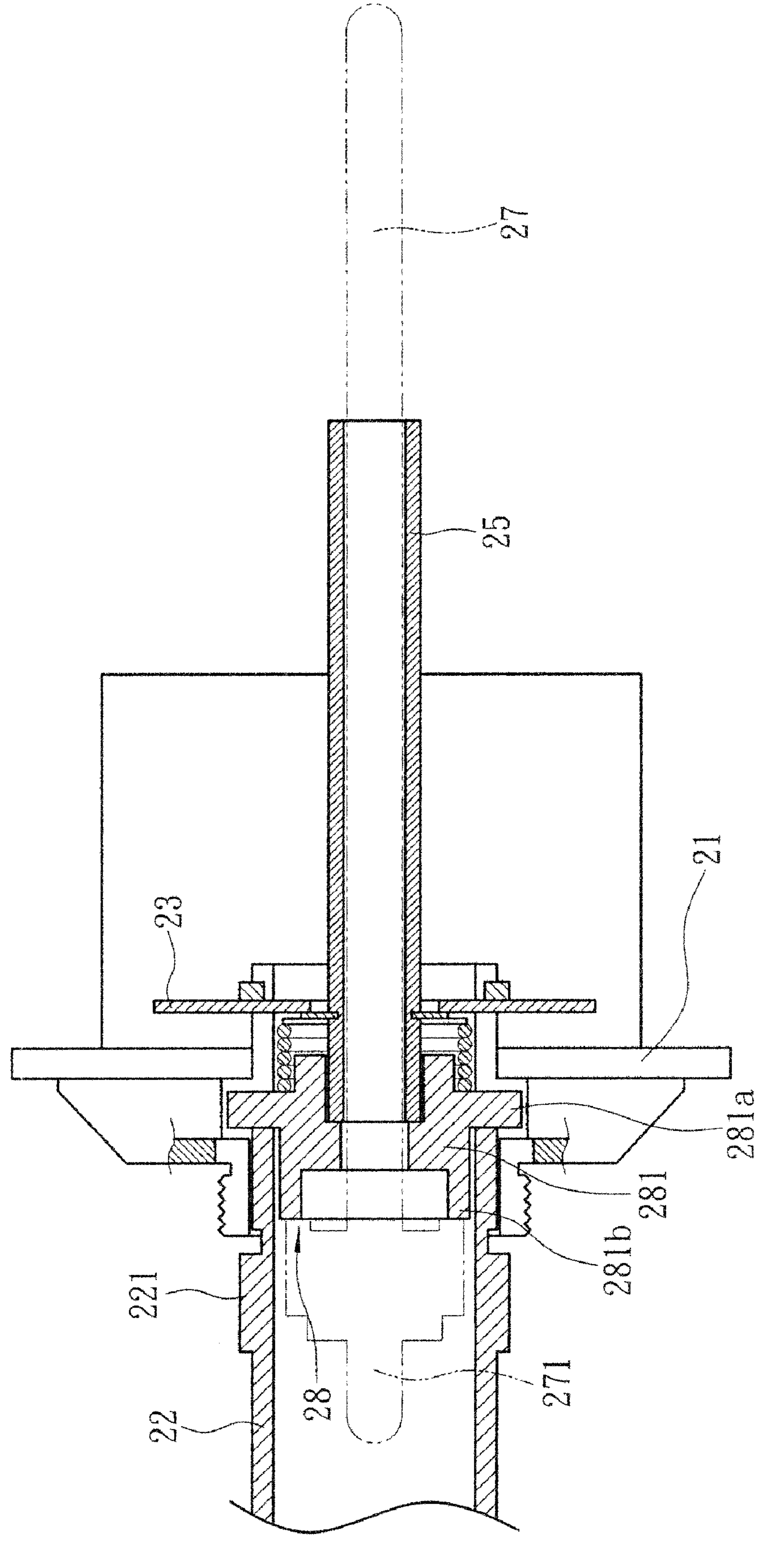
FIG. 5 is a schematic view showing the positions of the connecting shaft and the rotator when the disclosed door lock is unlocked.
Figure 6:
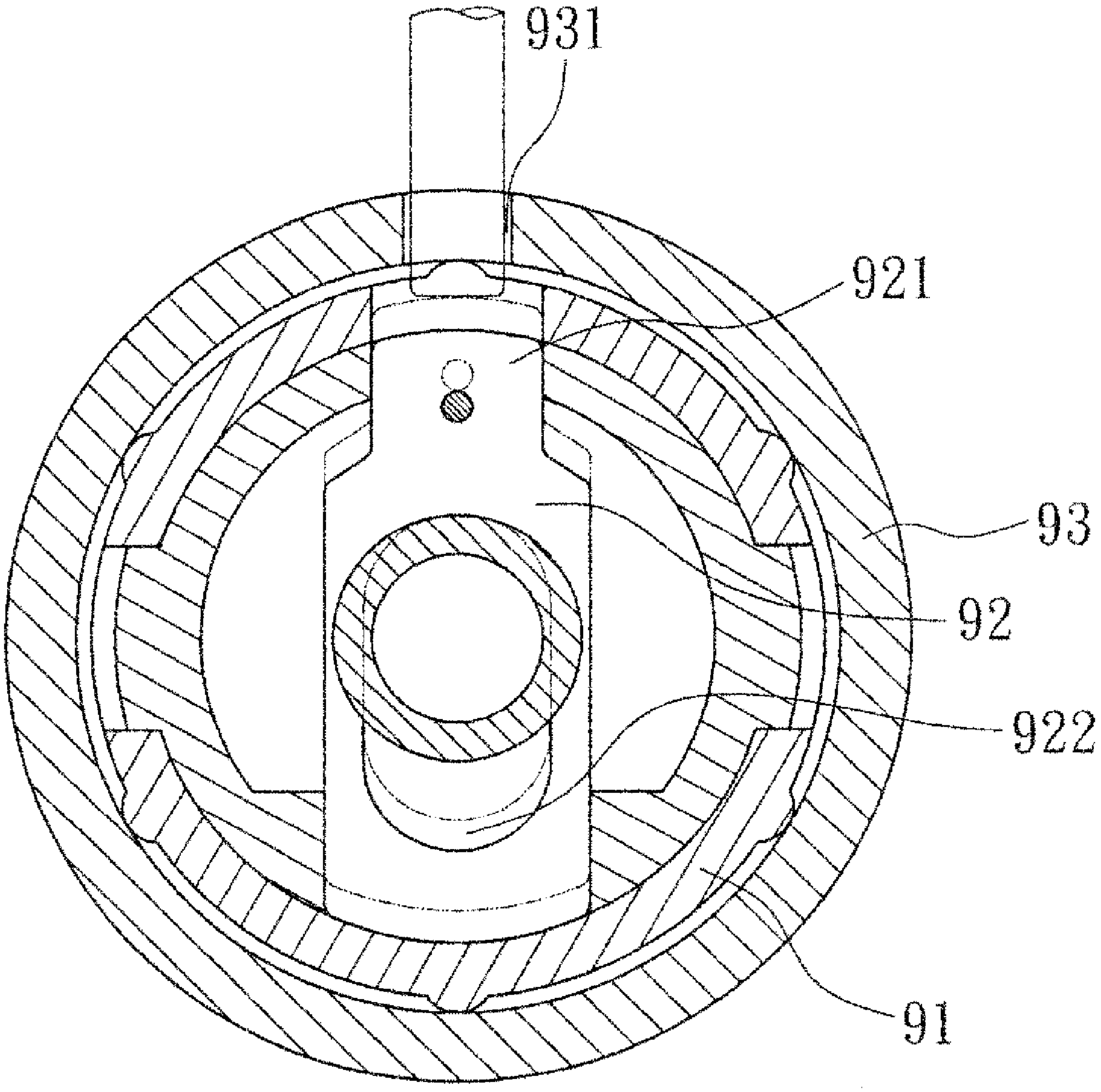
FIG. 6 PRIOR ART
FIG. 6 is a cross-sectional view showing the structure of a conventional door lock.

The lock control device 28 is disposed in the circular spacer 22 inside the positioning base 21. The connecting shaft 27 also goes through the lock control device 28 and controls its lock state. The lock control device 28 has a rotor 281 in the circular spacer 28. Two opposite sides of the rotor 281 have a stopping block 281*a*, respectively. The two opposite sides of its bottom are provided with an arc section 281*b* respectively. The arc section 281 is disposed in the circular spacer 22 corresponding to the stopping part 271 on one end of the connecting shaft 27. When the connecting shaft 27 turns, its leads the two arc sections 281*b* of the rotor 281 so that the rotor 281 performs a reciprocal motion in the circular spacer 22 (as shown in FIGS. 4 and 5). A compressible spring is inserted between the other end of the arc section 281*b* of the rotor 281 and the fixing element 23, thereby positioning the rotor 281 inside the circular spacer 22. The two stopping blocks 281*a* are mounted in the circular spacer 22 through the second concave parts 224 thereof. The bottoms of the two second concave parts 224 prevent the stopping blocks 281*a* of the rotor 281 to position the rotor 281. When positioning, the two stopping parts 281*a* of the rotor 281 fall into the two first concave parts 212 of the positioning base 21. The connecting shaft 27 leads the two stopping parts 281*a* of the rotor 281 to escape from or enter the two first concave parts 212 of the positioning base 21, thereby controlling the relative rotation between the circular spacer 22 and the positioning base 21.

One side of the handle 4 has a connecting hole 41 for the circular spacer 22 outside the positioning base 21 to connect. At the corresponding position of the protruding pact 262 of the limiting element 26, the handle 4 has a concave hole 42 for the protruding part 262 to fall into. In this embodiment, the handle 4 is formed with a little circular hole 44 for one to press the protruding part 262 of the limiting element at the corresponding position of the concave hole 42. A lock 5 with a lock core 51 is disposed in the handle 4. The lock core 51 allows the insertion and turning of a key on one end. Two opposite sides of its other end are formed inward with a groove 511, respectively, for the stopping part 265 of the limiting element 26 to fall into. One end of the groove 511 is connected with the extended end of the connecting shaft 27. Moreover, the lock core 51 has a protruding mover 512 for moving and turning the connecting shaft 27 on two opposite sides near the groove 511.

When the key is pulled out of the lock along a specific direction, the protruding part is restricted to block at the outer edge of the lock core. The handle thus cannot escape from the block when the protruding part is pressed.

Figure 2:
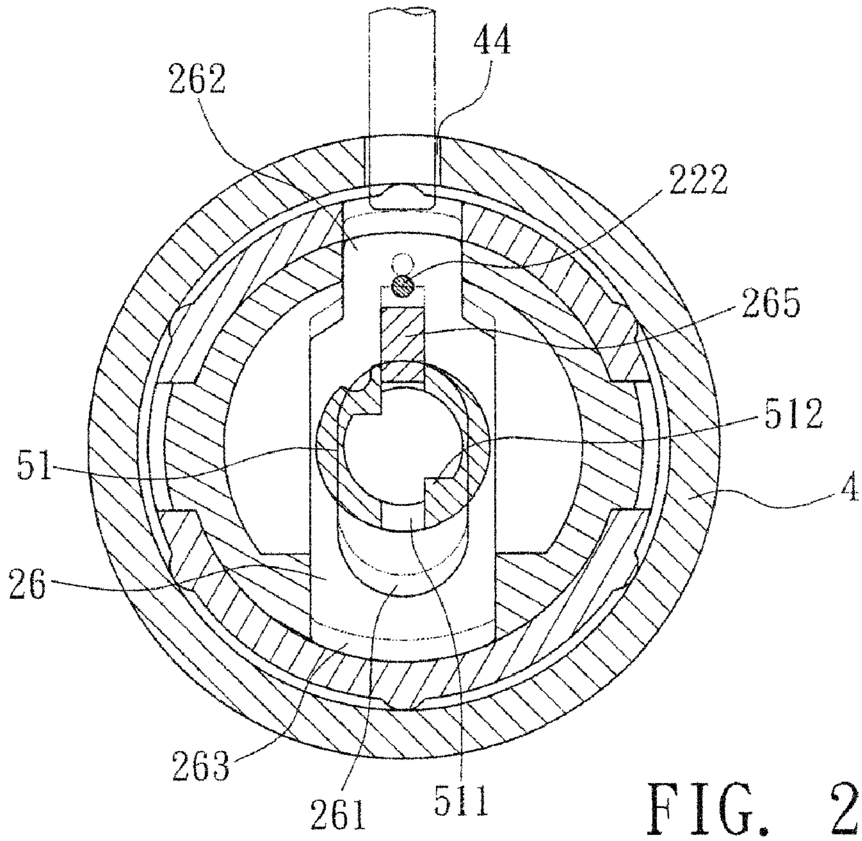
FIG. 2 is a cross-sectional view of the limiting element and the lock core in the unlock state according to the invention.

The lock 5 is set to rotate in a specific direction. In this embodiment, only when the lock core 51 and the key are both in the horizontal direction can the key be pulled out of or inserted into the lock core 51. When the key is inserted into the lock 5, it brings the lock core 51 to change the direction of the grooves 511. In this case, one can use an appropriate tool to press the protruding part 262 of the limiting element 26 through the little circular hole 44 on the handle 4. Because the inner wall of the circular spacer 22 corresponding to the protruding part 262 has a hollow part 263 and the stopping part 265 of the limiting element 26 can slide in the groove 511 on the end of the lock core 51 of the lock 5, the protruding part 226 of the limiting element 26 can retreat into the circular spacer 22 when the protruding part 262 is depressed. When the concave hole 42 of the handle escapes form the block as the protruding part 262 of the limiting element 26 retreats, the handle 4 can be readily taken off the circular spacer 22 (FIG. 2).

Figure 3:
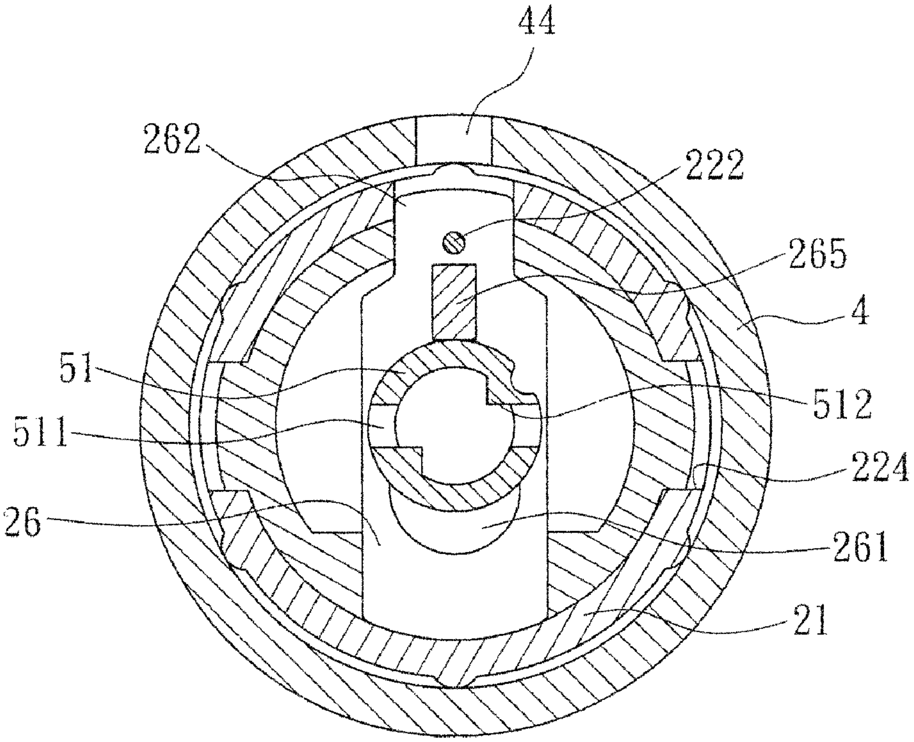
FIG. 3 is a cross-sectional view of the limiting element and the lock core in the lock state according to the invention.

When the key is pulled out of the lock 5 along a specific direction, the stopping part 265 of the limiting element 26 and the grooves 511 of the lock core 51 mismatch. When one presses the protruding part 262 of the limiting element 26, the stopping part 265 is blocked by the outer edge of the lock core 51. Therefore, the limiting element 26 cannot retreat along the pressing direction. The concave hole 42 on the handle 4 thus cannot escape from the block of the protruding part 262 of the limiting element. In this case, the handle cannot be taken off the circular spacer 22 (FIG. 3).

A primary advantage of the invention is that the disclosed door lock structure determines whether to prevent the protruding part 262 of the limiting element 26 from leaving the concave hole 42 of the handle 4 according to whether the key is inserted into or pulled out of the lock. Therefore, one cannot readily take the handle 4 off the circular spacer 22. This increases the difficult of unlocking using tools other than the right key, achieving a better anti-theft effect.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that tall within the true scope of the invention.

What is claimed is:

1. A door lock with an improved structure having a turning device on the outer side of a door, the turning device comprising:

a positioning base on the outer side of the door, which has a through hole;

a hollow circular spacer, which penetrates from the inner side of the positioning base outwards through the through hole and whose one end is pivotally connected to the inner side of the positioning base;

a limiting element, which is vertically disposed in the circular spacer on the outer side of the positioning base, whose center has a connecting hole, and whose one end has a protruding part extending out of the circular spacer for its user to press;

wherein a stopping part protrudes from the circular spacer between the protruding part and the connecting hole, the end of the protruding part of the limiting element is urged by an elastic element disposed in the circular spacer, and the circular spacer has space for the limiting element to move along the depressing direction of the protruding part;

a connecting shaft, whose one end goes through the positioning base and is positioned in the circular spacer outside the positioning base with the end extending out of the connecting hole of the limiting element, the diameter of the connecting hole being larger than the diameter of the connecting shaft;

a lock control device, which is disposed in the circular spacer inside the positioning base, wherein the connecting shaft also goes through the lock control device to control its lock state; and a handle, which has a junction hole on one side for mounting on the circular spacer outside the positioning base, a concave hole at a position corresponding to the protruding part of the limiting element and in communication with the exterior for the protruding part to fall into and to block, and a lock having a lock core whose one end allows the insertion and turning of a key and whose other end has inward grooves on two opposite sides, respectively, for a stopping part of the limiting element to fall into when the lock is unlocked, one end of the groove being connected with the extended end of the connecting shaft so as to move the connecting shaft as it turns;

wherein the stopping part of the limiting element falls into the grooves on the lock core end of the lock when the door lock is unlocked for the limiting element to retreat into the circular spacer as the protruding part is depressed, and the stopping part of the limiting element mismatches with the grooves on the lock core end of the lock when the door lock is locked for the limiting element not to retreat into the circular spacer as the protruding part is depressed because of the block of the outer edge of the lock core.

2. The door lock with an improved structure according to claim 1, wherein the lock control device has a rotor in the circular spacer, two stopping blocks disposed on two opposite sides of the rotor, one stopping block on each site of the rotor, the positioning base has a first concave part in communication with the through hole on two opposite sides of the through hole, the circular spacer has a second concave part corresponding to the first concave part of the positioning base on both sides of the end pivotally connected with the positioning base, respectively, the two stopping blocks of the rotor are mounted in the circular spacer via its second concave parts, the bottoms of the two second concave parts block the stopping block of the rotor and position the rotor, the two stopping blocks of the rotor fall into the two first concave parts of the positioning base when positioning, and the relation rotation between the circular spacer and the positioning base is controlled by rotating the connecting shaft, leading the two stopping blocks of the rotor to escape from or fall into the two first concave parts of the positioning base.

* * * * *